United States Patent [19]

Ongchin

[11] 4,246,142
[45] Jan. 20, 1981

[54] VULCANIZABLE SEMI-CONDUCTIVE COMPOSITIONS

[75] Inventor: Lucio Ongchin, Warren, N.J.

[73] Assignee: Union Carbide Corporation, New York, N.Y.

[21] Appl. No.: 729,096

[22] Filed: Oct. 4, 1976

[51] Int. Cl.³ .............................................. C08K 3/04
[52] U.S. Cl. ............................... 252/511; 260/42.29; 260/42.32
[58] Field of Search .......................... 260/42.29, 42.32; 252/511

[56] References Cited

U.S. PATENT DOCUMENTS

| | | | |
|---|---|---|---|
| 3,719,769 | 3/1973 | Miyauchi et al. | 174/110 PM |
| 3,862,056 | 1/1975 | Hartman | 260/42.36 |
| 3,950,604 | 4/1976 | Penneck | 428/451 |

FOREIGN PATENT DOCUMENTS 12682  1/1976  Japan .
12683  1/1976  Japan .

OTHER PUBLICATIONS

Derwent Abstract of German Patent Publication No. 2,344,067.
Derwent Abstract of Belgium Pat. No. 766,114.

*Primary Examiner*—James H. Derrington
*Attorney, Agent, or Firm*—James C. Arvantes; Reynold J. Finnegan

[57] ABSTRACT

Vulcanizable semi-conductive compositions that can be used to provide strippable insulation shielding compositions for electrical conductors, and articles of manufacture wherein the cross-linked products of said vulcanizable compositions are directly bonded to a crosslinked polyolefin substrate.

5 Claims, No Drawings

VULCANIZABLE SEMI-CONDUCTIVE COMPOSITIONS

BACKGROUND OF THE INVENTION

This invention relates to vulcanizable semi-conductive compositions which provide strippable semi-conductive insulation shielding compositions for insulated electrical conductors.

The construction of insulated electrical conductors, i.e. wires and cables, designed for medium to high voltage applications is well known in the art and commonly comprises a core conductor which comprises one or more strands of a conducting metal or alloy such as copper or aluminum, a layer of semi-conductive conductor shielding, a layer of insulation, such as crosslinked polyethylene, and a layer of semi-conductive insulation shielding overlying said insulation. A plurality of neutral wires which are usually made of copper or aluminum may be embedded in or wrapped around the layer of semi-conducting insulation shielding, if desired, in the form of a concentric ring around the insulated cable.

The formation of crosslinking bonds between the insulation and shielding makes subsequent separation of the two layers (insulation and semi-conductive shielding) such as occurs in making splices or terminal connections, very difficult and time consuming. Such a strong bond also makes the semi-conductive layer prone to leave carbon residue on the insulation even when it is finally peeled off. Accordingly, a strippable semi-conductive shielding which can be easily and cleanly stripped from the insulation of an insulated conductor is therefore very desirable in this art.

It has now been discovered that strippable semi-conductive insulation shielding compositions can be prepared from the vulcanizable semi-conductive insulation shielding compositions of this invention which contain both an ethylene copolymer and butadiene-acrylonitrile copolymer as described more fully below.

Thus, it is an object of this invention to provide a vulcanizable semi-conductive insulation shielding composition which is particularly useful for providing a strippable shielding for insulated electrical conductors, e.g. wires and cables, that contain, as the primary insulation, a crosslinked polyolefin. Another object of this invention is to provide an article of manufacture comprising the crosslinked product of said vulcanizable semi-conductive insulation shielding composition of this invention bonded directly to a crosslinked polyolefin substrate. Yet another object of this invention is to provide an article of manufacture as defined above wherein said crosslinked polyolefin is the primary insulation of an insulated electrical conductor, thus providing insulated electrical conductors, e.g. wires and cables, comprising, as the primary insulation, a crosslinked polyolefin, and as the material for said insulation an easily strippable crosslinked semi-conductive shielding composition. Other objects and advantages of this invention will become readily apparent from the following description and appended claims.

DESCRIPTION OF THE PREFERRED EMBODIMENT

More specifically the instant invention may be described as a strippable vulcanizable semi-conductive insulation shielding composition consisting essentially of (A) an ethylene copolymer selected from the group consisting of an ethylene-alkyl acrylate copolymer containing from about 15 to 45 weight percent of alkyl acrylate based on the total weight of said copolymer, said alkyl acrylate being selected from the group consisting of the $C_1$ to $C_8$ alkyl esters of acrylic acid and methacrylic acid, and an ethylene-vinyl acetate copolymer containing from about 15 to 45 weight percent of vinyl acetate based on the total weight of said copolymer, (B) a butadiene-acrylonitrile copolymer containing from about 10 to about 50 percent by weight of acrylonitrile based on the total weight of said copolymer, (C) conductive carbon black, and (D) a peroxide crosslinking agent wherein the weight ratio of (A) to (B) in said composition is 1:9 to 9:1, wherein the weight ratio of (C) to the sum weight of (A)+(B) in said composition is 0.1 to 1.5 and wherein (D) is present in an amount of from about 0.2 to about 5 percent by weight based on the total weight of the composition.

The vulcanizable ethylene-alkyl acrylate copolymers and/or their methods of preparation which can be employed in this invention are well known in the art. Illustrative ethylene-alkyl acrylate copolymers include the copolymers of ethylene and the $C_1$ to $C_8$ alkyl esters of acrylic acid or methacrylic acid such as methyl acrylate, ethyl acrylate, methyl methacrylate, butyl methylacrylate, 2-ethyl hexyl acrylate and the like, the preferred copolymer being an ethylene-ethyl acrylate copolymer. The ethylene-alkyl acrylate copolymer employed herein should contain from 15 to 45 weight percent of alkyl acrylate based on the total weight of said copolymer.

The vulcanizable ethylene-vinyl acetate copolymers and/or their methods of preparation, which can be employed in this invention are well known in the art. The ethylene-vinyl acetate copolymer employed herein should contain from 15 to 45 weight percent of vinyl acetate based on the total weight of said copolymer.

Of course, it is understood that while it is generally preferred to employ only one type of ethylene copolymer in a given composition the vulcanizable compositions of this invention also include and encompass the use of mixtures of two or more different ethylene-alkyl acrylate copolymers, mixtures of two or more ethylene-vinyl acetate copolymers having different weight percents of vinyl acetate, as well as mixtures of ethylene-alkyl acrylate and ethylene-vinyl acetate copolymers. Moreover, of the two types of ethylene copolymers, ethylene-vinyl acetate is preferred.

The vulcanizable butadiene-acrylonitrile copolymers and/or methods for their preparation are well known in the art. Such copolymers are also commonly referred to in the art as nitrile rubber or simply NBR. The butadiene-acrylonitrile copolymers employable in this invention can contain from about 10 to about 50 weight percent of acrylonitrile based on the total weight of the copolymer. Of course, if desired, mixture of such copolymers having different weight percents of acrylonitrile can also be employed.

The employment of conductive carbon black in semi-conductive insulation shielding compositions is well known in the art and any conductive carbon black in any suitable form can be employed in this invention including channel blacks or acetylene blacks, providing they are electrically conductive.

As pointed out above, the weight ratio of (A) ethylene copolymer to (B) butadiene-acrylonitrile copolymer in the vulcanizable semi-conductive insulation shielding compositions of this invention is 1:9 to 9:1, while the weight ratio of conductive carbon black (C) to the sum weight of ethylene copolymer plus butadiene-acrylonitrile copolymer (A+B) in said compositions is 0.1 to 1.5. Thus, for example, based on 100 parts by weight of the sum of ethylene copolymer (A) plus butadiene-acrylonitrile copolymer (B) the weight ratio of ethylene copolymer (A) to butadiene-acrylonitrile copolymer (B) to conductive carbon black (C) ranges from about 10 to about 90 parts by weight of ethylene copolymer (A) to about 90 to about 10 parts by weight of butadiene-acrylonitrile copolymer (B) to about 10 to about 150 parts by weight of conductive carbon black.

Any peroxide crosslinking agent used in heretofore conventional semi-conductive compositions can be employed in this invention. Illustrative examples of such peroxide crosslinking agents include e.g. di-$\alpha$-cumyl peroxide, 2,5-dimethyl-2,5-di(tertiary-butylperoxy)-hexyne-3 and the like. While the preferred amount of crosslinking agent employed herein may vary depending upon the particular copolymers employed and other such obvious conditions, in general, it is considered that said amount of crosslinking agent will normally fall within the range of about 0.2 to 5, preferably about 0.6 to 2, weight percent based on the total weight of the vulcanizable semi-conductive composition.

Whether or not a particular vulcanizable composition will furnish a crosslinked polyolefin insulated electrical conductor with a strippable semi-conductive insulation shielding, may be generally determined by measuring the adhesion between a laminate of crosslinked polyolefin and the crosslinked product of the vulcanizable semi-conductive composition according to ASTM-D903. While the actual adhesion levels of such layers on a conductor may be slightly higher than that obtained for the corresponding laminate, the above test serves as a useful guideline for predetermining such results.

Of course, it is to be also understood that the vulcanizable semi-conductive insulation shielding composition of this invention, if desired, can contain other conventional additives in the conventionally used quantities commonly employed in semi-conductive compositions. Examples of such additives include e.g. age resistors, processing aids, stabilizers, antioxidants, crosslinking boosters and retarders, pigments, fillers, lubricants, ultraviolet stabilizers, antiblock agents and the like. The total amount of such additives which are commonly used normally amounts to no more than about 0.05 to 3 percent by weight based on the total weight of the insulation shielding composition. For instance, it is generally preferred to employ about 0.2 to about 1 percent by weight based on the total weight of the insulation shielding composition of an antioxidant such as polymerized 1,2-dihydro-2, 2,4-trimethylquinoline.

As pointed out above, another aspect of this invention may be described as an article of manufacture comprising the crosslinked product of the vulcanizable semi-conductive shielding composition of this invention defined above bonded directly to a crosslinked polyolefin substrate. Said article of manufacture may take any shape or form desired, e.g. it could be a laminated plaque or sheet, which is obviously useful in determining whether or not said crosslinked product would be useful as an easily strippable insulation shielding for an electrical conductor as explained above.

More preferably, the crosslinked polyolefin of said article of manufacture of this invention is the primary insulation of an insulated electrical conductor, the crosslinked product of said vulcanizable composition being the external semi-conductive shielding for said insulation. Accordingly, the preferred article of manufacture of this invention may be more specifically described as an insulated electrical conductor, e.g. electrical wire, electrical cable, etc., containing as the primary insulation, crosslinked polyolefin and as the external semi-conductive shielding for said insulation, the crosslinked product obtained upon crosslinking the vulcanizable semi-conductive insulation shielding composition of this invention which has been already previously defined above.

Of course, it is to be understood that the term "crosslinked olefin" as used herein includes and encompasses compositions derived from a crosslinkable polyethylene homopolymer or a crosslinkable polyethylene copolymer such as ethylene-propylene rubber or ethylene-propylene-diene rubber insulations for electrical conductors. Normally, the preferred crosslinked polyolefin insulation is derived from a crosslinkable polyethylene homopolymer. The use of articles of manufacture containing a crosslinked shielding directly bonded to a crosslinked polyolefin substrate and the manner of their preparation are so well known that no further discussion is required to enable one skilled in the art to understand how to produce and use said articles. For instance, the vulcanizable semi-conductive shielding composition can be extruded over a crosslinked polyolefin substrate and cured (crosslinked) thereon or it can be extruded over an uncrosslinked polyolefin substrate and both crosslinkable layers simultaneously cured. Moreover use of low density polyolefin compositions which if desired, may contain conventional additives such as fillers, age resistors, talc, clay, calcium carbonate and other processing aides, along with a conventional crosslinking agent is well known in the art as are conventional semi-conductive conductor shielding compositions. In general, it is considered desirable to prevent any premixing of the insulation composition and vulcanizable semi-conductive insulation shielding composition prior to curing said compositions since such can allow the crosslinking agents employed to assert their influence on adhesion between the two layers through intercrosslinking across the interface of the two layers. The other particular attributes of the articles of manufacture of this invention e.g. insulated electrical conductors may also conform to the conventional structure of such articles and are not critical for they depend for the most part merely upon the desired end use of such articles.

The following examples are illustrative of the present invention and are not to be regarded as limitative. It is to be understood that all parts, percentages and proportions referred to herein and in the appended claims are by weight unless otherwise indicated.

GLOSSARY

EVA = ethylene-vinyl acetate copolymer
NBR = butadiene-acrylonitrile copolymer

EXAMPLES 1-3

Three vulcanizable semi-conductive compositions containing the following ingredients were prepared, the amounts of all the ingredients in each composition being based on the total weight of each composition.

TABLE I

| Vulcanizable Composition | Example 1 (wt. %) | Example 2 (wt. %) | Example 3 (wt. %) |
|---|---|---|---|
| EVA* | 48 | 53 | 58 |
| NBR** | 10 | 5 | — |
| Conductive Carbon Black | 40 | 40 | 40 |
| Antioxidant+ | 0.4 | 0.4 | 0.4 |
| Peroxide++ | 1.6 | 1.6 | 1.6 |

*Ethylene (78-83%)/Vinyl Acetate (17-22%) Copolymer Melt Index 35-55
**Butadiene (67%)/Acrylonitrile (33%) Copolymer, (B.F. Goodrich's Hycar 1052)
+Polymerized 1, 2-dihydro-2, 2, 4-trimethylquinoline
++Di-α-cumyl peroxide Each composition was formed in the same manner by uniformly admixing the components thereof in a Banbury mixer and about 1350 grams of each composition was prepared.

In order to evaluate the strippability properties of these compositions as semi-conducting insulation shieldings, each composition was respectively used to prepare a polyethylene semi-conductive laminate. Said laminates were prepared from laboratory test plaques, the polyethylene plaques in each instance were derived from a crosslinkable polyethylene homopolymer composition consisting of polyethylene homopolymer (98%), di-α-cumyl peroxide (2%) and bis(2-methyl-5-tertiary-butyl-4-hydroxyphenyl) sulfide (0.2%), an antioxidant.

The polyethylene/semi-conductive laminates were made by first molding the polyethylene plaque and crosslinking same. Then the vulcanizable semi-conductive plaques were separately molded, but not crosslinked, and the laminates made by pressing and heating each vulcanizable semi-conductive plaque together with one of the crosslinked polyethylene plaques during which time the vulcanizable semi-conductive composition became crosslinked. Each laminate was prepared in the same manner and under the same conditions.

The adhesion between the test laminates was then determined by measuring the peel strength between the two plaques of the laminate in terms of pounds per inch strip, i.e. the force in pounds per inch strip necessary to peel or strip the crosslinked semi-conductive shielding layer from the crosslinked polyethylene insulation layer. Each adhesion test was performed in the same manner and under the same conditions. The test results for each laminate (said results representing the average value for testing five such laminates for each vulcanizable semi-conductive composition are given in Table II below.

In addition other various physical property tests were conducted on a neat crosslinked molded plaque made from each vulcanizable semi-conductive composition and the results of said tests are also given in Table II below.

TABLE II

| Physical Properties | Example 1 | Example 2 | Example 3 |
|---|---|---|---|
| Laminate Adhesion Lbs. per inch strip | 17.5 | 17.5 | 18.2 |
| *Tensile Strength, psi | 2220 | 2200 | 2140 |
| *Elongation, % | 160 | 156 | 143 |
| **Tensile Strength, psi | 2570 | 2180 | 2130 |
| **Elongation | 43 | 103 | 146 |
| Brittleness at −30° C. | 3 No Good/ 12 Good | 2 No Good/ 13 Good | 3 No Good/ 12 Good |
| ***Volume Resistivity | | | |
| ohm-cm, 23° C. | 6 | 8 | 8 |
| ohm-cm; 40° C. | 7 | 9 | 11 |
| ohm-cm; 60° C. | 10 | 17 | 36 |
| ohm-cm. 80° C. | 22 | 46 | 119 |
| ohm-cm, 90° C. | 25 | 49 | 123 |

*Average of 3 runs
**Average of 3 runs after the crosslinked semi-conductive plaque had been aged at 130° C. for 1 week.
***Average of 2 runs.

The above data demonstrates that the vulcanizable semi-conductive compositions of this invention will provide good strippable semi-conductive insulation shieldings for insulated electrical conductors having as the primary insulation a crosslinked polyolefin. Note that the vulcanizable semi-conductive compositions of this invention which contain a butadiene-acrylonitrile copolymer in their crosslinked form (Examples 1 and 2) are more strippable from crosslinked polyethylene than a corresponding crosslinked ethylene-vinyl acetate semi-conductive composition that does not contain any butadiene-acrylonitrile copolymer (Example 3). Moreover, it is considered that the strippability of the crosslinked vulcanizable semi-conductive compositions of this invention from crosslinked polyethylene can be improved over that shown in Examples 1 and 2 by using an ethylene-vinyl acetate copolymer having a higher vinyl acetate content.

Various modifications and variations of this invention will be obvious to a worker skilled in the art and it is to be understood that such modifications and variations are to be included within the purview of this application and the spirit and scope of the appended claims.

What is claimed is:

1. A vulcanizable semi-conductive insulation shielding composition consisting essentially of (A) an ethylene copolymer selected from the group consisting of an ethylene-alkyl acrylate copolymer containing from about 15 to 45 weight percent of alkyl acrylate based on the total weight of said copolymer, said alkyl acrylate being selected from the group consisting of the $C_1$ to $C_8$ alkyl esters of acrylic acid and methacrylic acid, and an ethylene-vinyl acetate copolymer containing from about 15 to 45 weight percent of vinyl acetate based on the total weight of said copolymer, (B) a butadiene-acrylonitrile copolymer containing from about 10 to about 50 percent by weight of acrylonitrile based on the total weight of said copolymer, (C) conductive carbon black, and (D) a peroxide crosslinking agent, wherein the weight ratio of (A) to (B) in said composition is 1:9 to 9:1, wherein the weight ratio of (C) to the sum weight of (A)+(B) in said composition is 0.1 to 1.5 and wherein (D) is present in an amount of from about 0.2 to about 5 percent by weight based on the total weight of the composition.

2. A vulcanizable semi-conductive composition as defined in claim 1 wherein the ethylene copolymer is an ethylene-vinyl acetate copolymer.

3. A vulcanizable semi-conductive composition as defined in claim 2 wherein (D) is present in an amount of from about 0.6 to about 2 percent by weight based on the total weight of the composition.

4. A vulcanizable semi-conductive composition as defined in claim 3, wherein about 0.2 to about 1 percent by weight of an antioxidant based on the total weight of the composition is also present.

5. A vulcanizable semi-conducting composition as defined in claim 4 wherein said peroxide crosslinking agent is di-α-cumyl peroxide.

* * * * *

REEXAMINATION CERTIFICATE (701st)
United States Patent [19]
Ongchin

[11] B1 4,246,142
[45] Certificate Issued Jun. 9, 1987

[54] VULCANIZABLE SEMI-CONDUCTIVE COMPOSITIONS

[75] Inventor: Lucio Ongchin, Warren, N.J.

[73] Assignee: Union Carbide Corporation, New York, N.Y.

Reexamination Request:
No. 90/000,939, Jan. 17, 1986

Reexamination Certificate for:
Patent No.: 4,246,142
Issued: Jan. 20, 1981
Appl. No.: 729,096
Filed: Oct. 4, 1976

[51] Int. Cl.⁴ .............................................. H01B 1/12
[52] U.S. Cl. .................................... 252/511; 524/523; 524/524; 524/525
[58] Field of Search ................ 252/511; 524/523, 524

[56] References Cited
U.S. PATENT DOCUMENTS
3,873,494   3/1975   Lewis ............................ 260/42.37

FOREIGN PATENT DOCUMENTS
1258665   3/1961   France .

OTHER PUBLICATIONS
Naunton, W. J. S., "The Applied Science of Rubber", Edward Arnold Pub. Ltd., pp. 487–488.

*Primary Examiner*—James H. Derrington

[57] ABSTRACT

Vulcanizable semi-conductive compositions that can be used to provide strippable insulation shielding compositions for electrical conductors, and articles of manufacture wherein the cross-linked products of said vulcanizable compositions are directly bonded to a crosslinked polyolefin substrate.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-5 are cancelled.

* * * * *